3,623,857
GLASS MELTING POT
Norman Emerson McFadden, Defiance, Ohio, Walter Merton Perry, Darien, Conn., and Dennis Lee Ramge, Waterville, Ohio, assignors to Johns-Manville Corporation, New York, N.Y.
Filed Mar. 22, 1968, Ser. No. 715,371
Int. Cl. C03b 5/22
U.S. Cl. 65—347                                        5 Claims

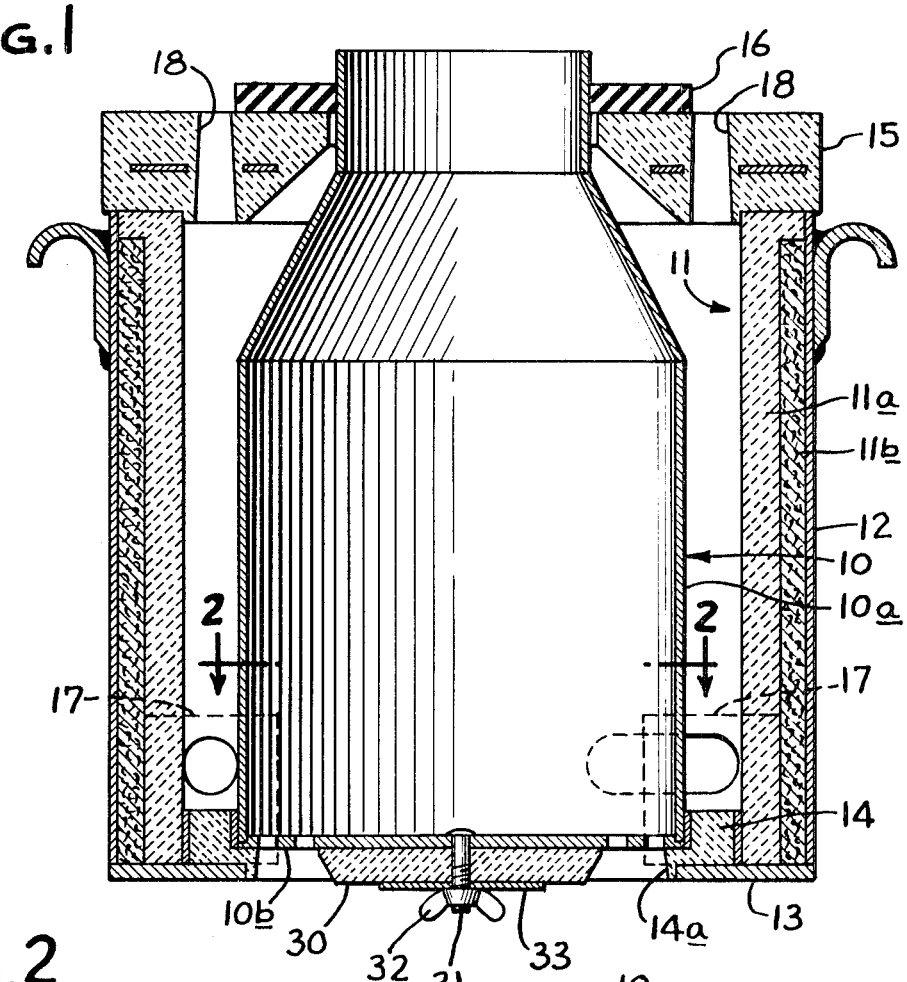
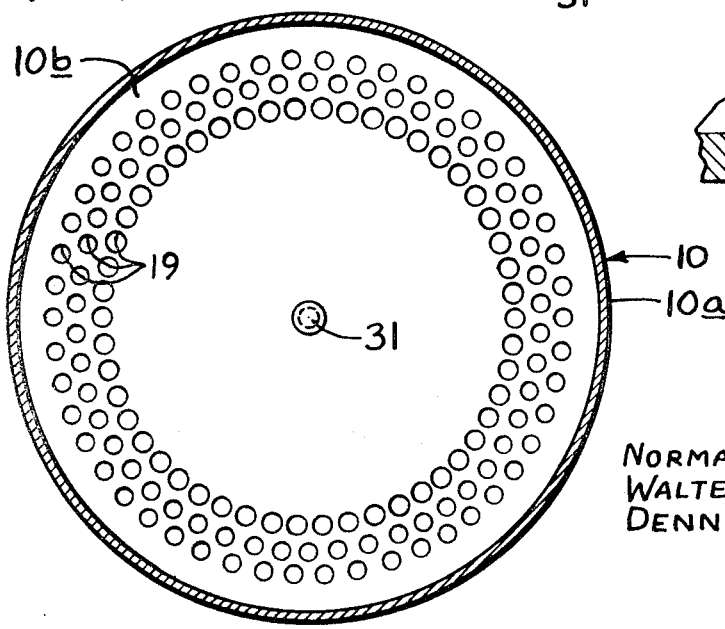
INVENTORS
NORMAN EMERSON MCFADDEN
WALTER MERTON PERRY
DENNIS LEE RAMGE
John A. McKinney
ATTY United States Patent Office 3,623,857
Patented Nov. 30, 1971

ABSTRACT OF THE DISCLOSURE

A glass melting pot of the type which has a multiplicity of apertures in the bottom thereof to permit the drawing of a multiplicity of continuous glass filaments therefrom. The main body of the pot is made of a high melting point nickel-chromium-iron base alloy, wherein iron is a minor constituent, and the apertures are fitted with tips made of one or more noble metals such as platinum.

DESCRIPTION OF THE INVENTION

The present invention relates generally to the art of glass melting and fiber formation and, more particularly, to an improved glass melting pot of the type which has a multiplicity of apertures in the bottom thereof to permit the drawing of a multiplicity of continuous glass fibers or filaments therefrom.

For many years, glass melting pots were made from platinum or platinum alloys wherein the glass was melted by electric induction heating. It is also known to make glass melting pots of refractory clay and, because of their low cost and ready availability, clay melting pots have enjoyed relatively widespread commercial usage even in very recent years. Another feature of the clay melting pot is that it permitted the use of gas fired flame to melt the glass in the pot. However, the relatively short operating life of the refractory clay pot, combined with other practical disadvantages well known to those familiar with this art, have led to an increasing effort to find an improved melting pot to replace the traditional refractory clay pots.

It is not practical to make a pot for this service entirely of platinum or a platinum alloy, because such pots obviously have a relatively high cost, and the platinum cannot be brought into contact with the conventional gas burners because of the reducing action of the gas flame on the platinum. Many other proposals have also been made, but they have all suffered from technical and/or economic shortcomings which have prevented any widespread commercial acceptance thereof.

It is therefore, a primary object of the present invention to provide an improved glass melting pot of the type used for the simultaneous drawing of a multiplicty of glass filaments, which provides an operating like many times longer than that of the traditional refractory clay pots, and because of this long life at a cost which makes it an attractive replacement for the clay pots. In this connection, it is a more particular object of the invention ot provide such an improved glass melting pot which has an operating life of a year or more, and perhaps even several years.

A related object of the invention is to provide an improved glass melting pot of the foregoing type which can be subjected to repeated shutdowns, such as the weekend shutdowns often made in a commercial plant, without any adverse effects on either the pot or the glass filaments drawn therefrom, and can be started up quickly and efficiently after such a shutdown. Another related object of the invention is to provide such an improved melting pot which reduces maintenance costs, and increases productivity by reducing the frequency of pot replacements.

Another object of the invention is to provide such an improved glass melting pot with which conventional gas burners can be used to melt the glass.

A still further object of the present invention is to provide such an improved glass melting pot which permits a greater density of apertures or orifices to be formed therein, thereby providing further significant increases in productivity.

Yet another object of the invention is to provide such an improved melting pot which provides more uniform and controllable temperatures throughout the body of molten glass contained therein, thereby improving the uniformity and quality of the glass filaments drawn therefrom.

Other objects and advantages of the invention will become apparent from the following detailed description and upon reference to the accompanying drawings, in which:

FIG. 1 is a sectional elevation view of a glass melting apparatus including a glass melting pot embodying the present invention, but omitting the sleeves that are inserted in the apertures in the bottom of the pot as shown in FIG. 3;

FIG. 2 is a horizontal section taken along line 2—2 in FIG. 1; and

FIG. 3 is a fragmentary section taken through the bottom corner of the glass melting pot shown in FIG. 1, on an enlarged scale, and including the sleeves inserted in the apertures in the bottom wall thereof.

While the invention will be described in connection with certain preferred embodiments, it will be understood that it is not intended to limit the invention to these particular embodiments. On the contrary, it is intended to cover all alternatives, modifications, and equivalent arrangements as may be included within the spirit and scope of the invention as defined by the appended claims.

Turning now to the drawings, a melting pot 10, having a cylindrical side wall 10a and a flat bottm wall 10b, is illustrated in an environmental apparatus for use in producing continuous glass fibers or filaments. The side wall 10a extends vertically upwardly from the bottom wall 10b and then tapers inwardly to form a vertical necked down inlet throat at the top of the pot through which glass marbles or other glass material can be admitted to the melting chamber inside the pot 10· In the preferred embodiment of the invention, the bottom wall 10b is secured to the side wall 10a by welding. However, it is noted that the bottom wall and side wall can be made in one piece. The environmental apparatus includes a cylindrical refractory casing 11 which is illustrated as being composed of two insulating layers 11a and 11b contained within a metallic outer shell 12. The refractory casing 11, which is dimensioned to provide an annular heating space or chamber around the outer surface of the pot 10, is supported on a metal bottom ring 13 joined to the bottom edge of the metal casing 12. To maintain the annular space between the pot 10 and the refractory casing 11, a refractory support ring 14 resting on the upper surface of the bottom ring 13 extends upwardly a short distance between the pot 10 and the casing 11 and is bonded to both the pot 10 and the inner refractory layer 11a by means of a suitable adhesive. To support the pot 10 within the environmental apparatus, the support ring 14 extends inwardly under the bottom wall of the pot 10 around the outer periphery thereof, and an integral depending flange 14a fits downwardly along the inner edge of the bottom ring 13 so as to automatically center the support ring 14 and the pot 10 supported thereon relative to the other components.

At the top of the assembly, an annular refractory lid 15 rests on the upper edge of the refractory casing 11 and extends inwardly into proximity with the throat or neck portion of the pot 10. To seal the small annular space between the neck of the pot 10 and the inner edge of the lid 15, an insulating neck seal 16 is fitted downwardly over the neck of the pot 10 into tight engagement with the upper surface of the lid 15.

For the purpose of melting the glass that is fed into the open top of the pot 10 in the form of marbles or the like, a series of four tangential gas burners 17 are equally spaced around the circumference of the pot 10 in the annular heating chamber between the pot and the refractory casing 11 just above the support ring 14. The flames from the four burners 17 move in a circumferential direction around the melting pot 10 but do not impinge directly thereon, and the resulting hot combustion gases circulate upwardly through the heating chamber until they are exhausted through exhaust ports 18 formed in the lid 15. The burners 17 are designed to heat the lower end of the pot 10 to a temperature above the melting point of the glass contained therein, while the upwardly circulating gases heat the upper portion of the pot to an appropriate preheating temperature for preheating the glass marbles or other supply material entering through the top opening.

For the purpose of forming a multiplicity of continuous glass filaments from the body of molten glass contained within the pot 10, the bottom wall 10b has a multiplicity of apertures 19 therein which may be arranged as desired and in the illustrated embodiment are arranged in three circles extending around the bottom wall near the outer periphery thereof. The head pressure of molten glass within the pot forces molten glass downwardly through the annular array of apertures, and the resulting filaments are continuously drawn downwardly and attenuated by conventional drawing rolls and worked according to any desired procedure. Because of the temperature gradient between the heated side walls of the pot 10 and the central portion thereof, the apertures of the innermost circle may be made slightly larger than those in the outer circles so that the filaments drawn from all three circles are of substantially uniform weight and size.

In accordance with the present invention, the glass melting pot 10 is made of a high melting point base metal alloy selected from the group consisting of nickel-chromium-iron base alloys, where iron is a minor constituent, and the filament-forming apertures in the bottom of the alloy pot are lined with sleeves made of one or more noble metals and preferably extending below the underside of the bottom wall of the pot. It is further noted that the side walls may be made from one kind of alloy and the bottom wall from another and different alloy. In the illustrative embodiment, the pot 10 is made entirely of one of the aforementioned base metal alloys, and a noble metal sleeve 20 (FIG. 3) is fitted within each of the apertures 19 so as to line the entire inner surfaces of the apertures with nobel metal. The sleeves 20 are flanged at their upper ends to retain them within the bottom wall 10b, and the lower ends thereof extend below the underside of the bottom wall so that the molten glass issuing therefrom does not contact the metal of the bottom wall 10b.

In a particularly preferred embodiment of the invention, the pot is made of an alloy containing at least about 72% by weight nickel, at least about 14% by weight chromium, and at least about 6% by weight iron, such as "Inconel 600" for example, and the sleeve are made of an alloy comprising 90% platinum and 10% rhodium. It is recognized that each of these exemplary materials has been individually used in previous glass melting apparatus, but the present invention stems from the discovery that the use of these materials in the particular combination described herein leads to an unexpected combination of technical and economic advantages which have not heretofore been attained in the glass fiber art.

Although various base metal alloys have been used heretofore in molten glass containers, and have even been considered suitable for use as tips or sleeves for lining the apertures used to draw glass filaments from molten glass containers, it has been surprisingly found that such materials are subject to severe corrosion and erosion at the lower ends of the filament-forming apertures. More particularly, it has been found that the upper edges of the apertures formed in the bottom of a base metal alloy pot remain sharp and clean over extended operating periods, including intermittent shutdowns, and yet the lower edges of the apertures become severely chamfered by corrosion and erosion until the molten glass wets the bottom wall between adjacent apertures, a phenomenon known in the art as "flooding." It is believed that this deterioration is caused by the glass-metal-air interface existing at the lower ends of the apertures during the pulling of glass filaments therefrom, and that intergranular corrosion occurs, at least in the case of certain alloys, resulting in disintegration or scaling of the surface material. This scaling material gradually flakes off and contaminates the molten glass as well as chamfering the aperture edges and causing a reduction in the thickness of the pot bottom wall. This deterioration is increased by intermittent operation of the type often encountered in commercial production.

In keeping with the present invention, it has been found that combining a pot made of a selected base metal alloy with noble metal sleeves lining the filament-forming apertures extends the life of the pot to a year or more, which is a sharp contrast with the average life of 30 days for the traditional refractory clay pots. In fact, the exact life time of melting pots constructed in accordance with this invention is not yet known because the earliest pots to be placed in use have not yet shown any signs of significant deterioration. The glass filaments drawn from such pots are extremely uniform and do not vary with the age of the pot. Moreover, it has been found that the combination of the alloy bottom wall and the noble metal sleeve reduces the temperature within the filament-forming apertures so that the main body of molten glass within the pot is maintained at a higher temperature, thereby rendering the glass more fluid so that it is distributed uniformly over the bottom of the pot and, consequently, produces more uniform filaments from the entire array of apertures. In addition to increased longevity and uniformity, the improved melting pots provided by this invention permit productivity to be increased by providing a relatively high density of apertures in the bottom wall of the pot; the metal alloy is so strong that even a small span of metal between adjacent apertures is sufficient to prevent the bottom wall from sagging after sustained high temperature operation. Furthermore, no external support is required for the central portion of the bottom wall, since it is entirely self-supporting even with an extremely high density of apertures as illustrated in FIG. 2.

The noble metal sleeves are preferably made of platinum, but other noble metals such as palladium as well as noble metal alloys such as palladium-ruthenium, platinum-palladium and platinum-rhodium and the like are also suitable. The preferred alloy for the pot is "Inconel 600" which has a nominal chemical composition of 76.0% nickel, 15.0% chromium, 7.0% iron, 0.25% manganese, 0.25% silicon, 0.1% copper and 0.06% carbon, by weight.

The metal alloy pot may be formed from either wrought or cast alloys. In the case of wrought alloys, the apertures in the bottom wall may be formed by drilling, and in the case of cast alloys the apertures may be formed during the casting. As described above, the bottom wall of the pot may be formed as a separate component so that it can be replaced as a separate unit while saving the side wall portion of the pot and also may be formed from a material different from that in the side wall.

In accordance with a further aspect of this invention, a separate insulating refractory disc 30 may be mounted on the underside of the central portion of the bottom wall of the melting pot, as shown in FIG. 1. This disc serves to retain heat within the central portion of the pot, thereby increasing the temperature of the molten glass in the center of the pot and reducing the thermal gradient between the center of the pot and the side walls thereof. In the particular embodiment illustrated, the insulating disc 30 is fitted over a threaded post 31 extending from the pot bottom wall, and secured by means of a wing nut 32 threaded against a support washer 33 on the underside of the disc 30. It has been found that the central portion of the pot bottom wall is sufficiently self-supporting to carry the weight of these additional elements without any adverse effect on the longevity or performance thereof.

While the invention has been described with specific reference to a melting pot of the type used to produce primary glass filaments which are subsequently flame attenuated to produce fine fibers for use in insulation and the like, it will be understood that the invention is also applicable to other types of glass melting pots and crucibles, such as those employed for the production of textile fibers and the like. Also, it should be recognized that the entire container need not be made of the particular alloys described above; for example, it may be desired to make only that portion of the container wall containing the filament-forming apertures of a base metal alloy. Various other modifications and applications of the invention will be apparent to those skilled in the art from the above description.

As used herein, the term "base metal alloy," such as "nickel-base alloy," refers to an alloy containing a major portion, i.e., at least about 50% by weight, of the specified base metal such as nickel.

We claim as our invention:

1. An improved glass melting pot for containing a body of molten glass to be drawn into glass filaments, said pot comprising an upstanding side wall and a bottom wall, said side wall and said bottom wall being made of alloys consisting essentially of nickel-chromium-iron where iron is a minor constituent, said alloys having a melting point substantially higher than that of the glass to be melted therein, said bottom wall having a multiplicity of apertures formed therein to permit the drawing of glass filaments from the molten glass contained in said pot, and a protective noble metal lining for the inner surfaces defining said apertures.

2. An improved glass melting pot as set forth in claim 1 wherein said alloy contains at least about 72% by weight nickel, at least about 14% by weight chromium, and at least about 6% by weight iron.

3. An improved glass melting pot as set forth in claim 1 wherein said alloy contains about 76% by weight nickel, about 15% by weight chromium, and about 7% by weight iron.

4. An improved glass melting pot as set forth in claim 1 wherein said noble metal is selected from the group consisting of platinum, palladium, palladium-ruthenium alloys, and platinum-rhodium alloys.

5. An improved glass melting pot for containing a body of molten glass to be drawn into continuous glass filaments, said pot comprising an upstanding side wall and a bottom wall made of an alloy consisting essentially of nickel-chromium-iron where iron is a minor constituent, said alloy having a melting point substantially higher than that of the glass to be melted therein, said bottom wall having a multiplicity of apertures formed therein to permit the drawing of glass filaments from the molten glass contained in said pot, said apertures being arranged in an annular array, a multiplicity of noble metal sleeves inserted in said apertures so as to line the entire inner surfaces of said apertures, said sleeves extending below the lower surface of said bottom wall, a thermally insulating refractory disc mounted on the underside of said bottom wall within said annular array of apertures, and a plurality of gas burners to maintain the glass inside the pot in a molten condition.

References Cited

UNITED STATES PATENTS

| 2,220,433 | 11/1940 | Wellech | 65—1 |
| 2,400,255 | 5/1946 | Pfeil | 75—171 X |
| 2,607,170 | 8/1952 | De Vries | 75—171 X |
| 2,931,062 | 4/1960 | Leaman | 65—374 |
| 3,134,659 | 5/1964 | Labino | 65—374 X |
| 3,134,828 | 5/1964 | Labino | 65—2 X |

S. LEON BASHORE, Primary Examiner

S. R. FRIEDMAN, Assistant Examiner

U.S. Cl. X.R.

65—374; 75—171